United States Patent Office 3,376,263
Patented Apr. 2, 1968

3,376,263
METHOD FOR PRODUCING HIGH MOLECULAR WEIGHT POLYOXYMETHYLENE
Shinichi Ishida, Kunio Sato, and Norimasa Fujita, Tokyo, Japan, assignors to Asahi Kasei Kogyo Kabushiki Kaisha, Osaka, Japan, a corporation of Japan
No Drawing. Filed Nov. 3, 1965, Ser. No. 506,275
Claims priority, application Japan, Nov. 27, 1964, 39/66,465
8 Claims. (Cl. 260—67)

ABSTRACT OF THE DISCLOSURE

A process for producing high molecular weight polyoxymethylene by polymerizing monomeric formaldehyde under substantially anhydrous conditions in the presence of 0.0001–0.2 mol percent of an aliphatic diaziridine compound having 2 to 20 carbon atoms per molecule as a reaction catalyst.

---

This invention relates to a method for producing plastic polyoxymethylenes having excellent thermal stability by polymerization of formaldehyde, and more particularly relates to a process in which diaziridine compounds are used to catalytically accelerate the polymerization of formaldehyde.

It is known that formaldehyde is polymerized in the presence of suitable catalysts such as tertiary or quaternary hydrogen bases, organometallic compounds, and alkali metal alcoholates to produce high molecular weight polyoxymethylene.

The purpose of this invention is to provide a novel catalyst and use for polymerization of formaldehyde.

The catalyst used in this invention is a compound of the following formula or a derivative thereof:

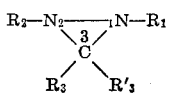

wherein $R_1$ and $R_2$ are independently selected from the group consisting of hydrogen, alkyl and cycloalkyl radicals, at least one of $R_3$ and $R_3'$ are alkyl or cycloalkyl radicals containing 1–20 carbon atoms and wherein $R_3$ and $R_3'$ may form together a 5, 6 or 7-membered ring.

Among the catalysts used in this invention are:

1,2-di-n-butyl-3-methyl-diaziridine
1-cyclohexyl-2-methyl-3-ethyldiaziridine
1,2-di-n-butyl-3-n-propyldiaziridine
1,2-di-n-butyl-3-n-hexyldiaziridine
1,2-dimethyl-3-n-hexyldiaziridine
pentamethylene diaziridine
1-tert.-butyl-3-propyl-diaziridine
1-methyl-2-n-butyl-3-n-hexyldiaziridine
1-ethyl-2-n-butyl-3-n-propyldiaziridine
1,2-di-n-butyl-3-(2-ethylhexyl)diaziridine
1,2-di-n-butyl-3-nonyldiaziridine
1,2-di-n-butyl-3-undecyldiaziridine
1,2-di-n-butyl-3-dodecyldiaziridine
1,2-n-butyl-3-cyclohexyldiaziridine
1-methyl-2-cyclohexyl-3-ethyldiaziridine
1-butyl-3-hexyldiaziridine
1-cyclohexyl-3,3-pentamethylenediaziridine
1-cyclohexyl-3-hexyldiaziridine
1-methyl-2-butyl-3-hexyldiaziridine In carrying out the polymerization according to this invention, reaction is preferably effected under substantially anhydrous condition, that is, in a reaction system containing usually less than 0.5%, especially less than 0.1% of water.

The formaldehyde used can be produced by a conventional method, for example, where formaldehyde produced by thermal decomposition of paraformaldehyde, α-polyoxymethylene, or trioxane is purified.

Aliphatic, alicyclic or aromatic hydrocarbons, aliphatic, alicyclic or aromatic halogenated hydrocarbons, or other inert compounds can be used as a reaction medium.

The amount of the solvent or medium used can be varied over a wide range, but 3–100 parts (volume) per weight of formaldehyde is preferable.

The polymerization temperature can be varied in the range between $-120°$ and $+100°$ C., preferably between $-90°$ and $+70°$ C.

A mixture of two or more of said catalysts, if necessary, can also be used in this invention. The catalyst can be directly added to a reaction solution, but is preferably added as a solution produced by dissolving the catalyst in an inert solvent.

The catalyst can be added to a solution of monomeric formaldehyde, but it is also possible to introduce formaldehyde into a solution of the catalyst.

The amount of the catalyst used can be varied over a wide range, but can be from 0.000001 mole to 0.2 mole, preferably from 0.00001 mole to 0.1 mole per 100 ml. of the solvent. The amount of the catalyst can be from 0.0001 mole percent to 0.2 mole percent based on formaldehyde.

After completion of the polymerization, the polymer obtained is removed from the solvent by means of filtration or centrifugation. This treatment can be carried out continuously or semicontinuously.

If necessary, the polymers produced according to this invention are subjected to stabilization treatments such as esterification, etherification and the like.

The catalyst used in this invention has many advantages. One of them is that it has a lower vapor pressure which enables one to measure the amount of the catalyst very precisely. Furthermore, the catalyst is neither expelled nor taken out from polymerization solvent by diffusion gas of formaldehyde, and thus the development of polymerization in the gaseous phase outside the polymerization solvent is prevented. The activity of the catalyst used in this invention is slightly lower than that of tertiary amines and this serves to control the progress of polymerization. Tertiary amines have extremely high activity and are easily affected by impurities, especially water. Diaziridines, however can be used more easily than tertiary amines.

It is also an advantage of the catalyst used in this invention that it has an appropriately high activity. This feature makes it possible to increase the polymerization rate, to effect the polymerization in a high yield, and to advantageously use the catalyst in continuous polymerization.

Furthermore, the polymers produced using this catalyst show more uniform molecular weight distribution than polyoxymethylene produced using a tertiary amine catalyst such as trimethylamine.

Use of the catalyst according to this invention improves the thermal stability of polyoxymethylene.

Even if the catalyst remains in and coexists with the polymer, the thermal stability of the polymer is not decreased, but rather is increased. For example, attempts have been made to add a stabilizer such as an aromatic primary amine during the polymerization step. However, the catalyst used in this invention has such stabilizing effects as are obtained by the addition of such a stabilizer.

The polyoxymethylene produced according to this invention and stabilized by said process can be converted into high grade thermoplastics with or without addition of pigments, fillers, plasticizers, stabilizers, antioxidants, etc.

Example 1

Monomeric formaldehyde produced by thermal decomposition of paraformaldehyde and nitrogen as a carrier gas were passed through six cooling traps at −18° C. and introduced into a solution formed by dissolving 0.3 g. of 1,2-di-n-butyl-3-methyldiaziridine in 100 ml. of anhydrous toluene. In the resulting solution, polymerization of formaldehyde was performed at −30° C. for 3 hours while stirring the solution. The polymerization product was filtered. The obtained polymer was washed with methanol and then with acetone, and thereafter dried at 60° C. for 24 hours under a reduced pressure to produce 120 g. of polyoxymethylene, which was 92.5% of the absorbed formaldehyde. The intrinsic viscosity of this polyoxymethylene is 2.2 in p-chlorophenol at 60° C. This polyoxymethylene was acetylated with acetic anhydride by a conventional procedure and hot-pressed to obtain a tough film.

Example 2

One hundred and forty grams of formaldehyde were absorbed into 1000 ml. of toluene by the same procedure as in Example 1. To the resultant solution 50 ml. of a toluene solution containing 0.02 g. of 1,2-di-n-butyl-3-n-propyldiaziridine were added at −30° C. while stirring the solution and thus polymerization of formaldehyde was effected in 3 hours. The polymerization product was treated by the same procedure as in Example 1 to produce 136 g. of pure-white polyoxymethylene. The reduced viscosity of the polymer was 2.41.

Example 3

The thermal decomposition product of α-polyoxymethylene was passed through a cooling tube at −20° C. and then cooled to −78° C. to obtain a liquefied product.

The liquefied formaldehyde was added dropwise to a solution of 0.2 g. of 1-cyclohexyl-2-methyl-3-ethyl diaziridine in 1000 ml. of anhydrous toluene at −20° C. while stirring the solution for more than 2 hours to be polymerized.

A portion of the polymerization product was filtered and the separated polymer was dried, while the remaining portion was treated by the same procedure as in Example 1 and the polymer was dried, to produce 92 g. in total of polyoxymethylene.

The intrinsic viscosity of thus obtained polyoxymethylene was 2.21. Both unwashed and completely washed polymers had the same thermal stability. Rather the unwashed portion shows a better thermal stability.

Example 4

Formaldehyde obtained by the thermal decomposition of α-polyoxymethylene was absorbed in various solvents at −30° C. and to each solution 0.05 mole percent of diaziridine per formaldehyde was added. Polymerization of formaldehyde was carried out at −30° C. The result obtained in each case is shown in the following table.

| Diaziridine | Solvent | Yield (Percent) | $\eta_{sp}/C$ |
|---|---|---|---|
| Pentamethylenediaziridine | Toluene | 92 | 2.31 |
| 1-ethyl-2-butyl-3-ethylhexyl diaziridine | Diethylether | 90 | 2.47 |
| 1,2-dimethyl-3-n-hexyl diaziridine | Methylene chloride | 90 | 2.22 |
| 1,2-di-N-butyl-dodecyl diaziridine | Hexane | 93 | 2.67 |

Example 5

Formaldehyde produced by the thermal decomposition of modified paraformaldehyde having purity of 99.5% was absorbed in toluene. Into this solution 0.02 weight percent of 1,2-di-n-butyl-3-cyclohexyl diaziridine was introduced by blowing at 25° C. while stirring the solution. After a lapse of 2 hours, the product was separated and dried under a reduced pressure to produce polyoxymethylene having a reduced viscosity of 2.73. The reaction rate constant of thermal decomposition at 222° C., $K_{222}$, of polyoxymethylene was 0.78%/min. and that of the polyoxymethylene acetylated with acetic anhydride and sodium was 0.06%/min. The $K_{222}$ of polyoxymethylene produced using triethylamine instead of diaziridine under the same conditions was 3.10%/min.

What is claimed is:

1. A method for producing a high molecular weight polyoxymethylene which comprises polymerizing purified, monomeric formaldehyde under substantially anhydrous conditions in the presence of 0.0001–0.2 mole percent, based on formaldehyde, of an aliphatic diaziridine compound having 2 to 20 carbon atoms per molecule as a reaction catalyst.

2. A method according to claim 1 wherein said diaziridine compound is 1,2-di-n-butyl-3-methyl diaziridine.

3. A method according to claim 1 wherein said diaziridine compound is 1-cyclohexyl-2-methyl-3-ethyl diaziridine.

4. A method according to claim 1 wherein said diaziridine compound is pentamethylene diaziridine.

5. A method according to Claim 1 wherein the polymerization is effected in an inert organic solvent at a temperature between −90° C. and +70° C.

6. A method according to claim 5 wherein from 0.000001 to 0.2 mole of diaziridine compound per 100 ml. of solvent is present as a reaction catalyst.

7. A method according to claim 5 wherein the inert organic solvent is selected from the group consisting of ethers, aliphatic hydrocarbons, alicyclic hydrocarbons, aromatic hydrocarbons, halogenated aliphatic, alicyclic and aromatic hydrocarbons.

8. A method for producing a high molecular weight polyoxymethylene which comprises polymerizing monomeric formaldehyde under substantially anhydrous conditions in the presence of up to 0.2 mol percent of a catalyst of the formula:

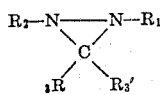

wherein $R_1$ and $R_2$ are independently selected from the group consisting of hydrogen, alkyl and cycloalkyl radicals, at least one of $R_3$ and $R_3'$ are alkyl or cycloalkyl radicals containing 1–20 carbon atoms and wherein $R_3$ and $R_3'$ may form a 5–7 membered ring.

No references cited.

WILLIAM H. SHORT, *Primary Examiner.*

L. M. PHYNES, *Assistant Examiner.*